United States Patent
Bertz et al.

(10) Patent No.: US 9,860,137 B1
(45) Date of Patent: Jan. 2, 2018

(54) INTELLIGENT PROVISIONING OF SERVICE POLICY RULES

(71) Applicant: Sprint Spectrum L.P., Overland Park, KS (US)

(72) Inventors: Lyle T. Bertz, Lee's Summit, MO (US); Mark Bales, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/964,369

(22) Filed: Dec. 9, 2015

(51) Int. Cl.
| | | |
|---|---|---|
| H04L 12/14 | (2006.01) | |
| H04W 72/12 | (2009.01) | |
| H04L 12/24 | (2006.01) | |
| H04W 4/00 | (2009.01) | |

(52) U.S. Cl.
CPC ...... H04L 41/5032 (2013.01); H04L 12/1407 (2013.01); H04L 41/5045 (2013.01); H04W 4/001 (2013.01)

(58) Field of Classification Search
CPC .............. H04L 12/1407; H04W 72/12; H04W 72/1257; H04W 72/0493
See application file for complete search history.

(56) References Cited

U.S. PATENT DOCUMENTS

| | | | | |
|---|---|---|---|---|
| 9,210,621 B1 * | 12/2015 | Bertz | ................ | H04W 36/0022 |
| 2012/0060198 A1 * | 3/2012 | Tremblay | ............ | H04L 12/1407 726/1 |
| 2012/0084425 A1 * | 4/2012 | Riley | .................... | H04M 15/00 709/223 |
| 2012/0117220 A1 | 5/2012 | Nieves | | |
| 2012/0275573 A1 * | 11/2012 | Lehane | ............... | H04L 12/1407 379/32.01 |
| 2012/0278464 A1 * | 11/2012 | Lehane | ............... | H04L 12/1407 709/223 |
| 2013/0304616 A1 * | 11/2013 | Raleigh | ................ | G06Q 20/145 705/34 |

OTHER PUBLICATIONS

Universal Mobile Telecommunications System; LTE; Policy and Charging Controll; Reference points (3GPP TS 29.212 version 12.9.0 Release 12) (Jul. 2015).
3rd Generation Partnership Project; Technical Specification Group Core Network and Terminals; Policy and Charging Control (PCC); Reference points (Release 13) (Jun. 2015).

* cited by examiner

Primary Examiner — Asghar Bilgrami (57) ABSTRACT

A method and corresponding system to help facilitate the application of service policy rules for client devices while reducing the amount of signaling between network entities is disclosed. In accordance with one example, the wireless network may evaluate the extent to which the service policy rules defined by the UE's service profile have been applied by the wireless network. Based on this evaluating, the network may identify a subset of service policy rules that have been applied to greater than a threshold extent by the network for the given UE. And in response to this identifying, the network may cause the PDP to provision the PEP, with the subset of service policy rules, rather than provision the PEP with every possible service policy rule. As a result, the PDP and PEP may refrain from engaging in excess signaling, and the wireless network, in turn, may enjoy reduced congestion.

17 Claims, 5 Drawing Sheets

INTELLIGENT PROVISIONING OF SERVICE POLICY RULES

BACKGROUND

Unless otherwise indicated herein, the materials described in this section are not prior art to the claims and are not admitted to be prior art by inclusion in this section.

In general, a telecommunication system may define an access network configured to provide client devices with connectivity to one or more transport networks such as the public switched telephone network (PSTN) or the Internet. Such an access network may include a policy decision point (PDP) that manages service policy rules defining service levels for served client devices, and a policy enforcement point (PEP) that enforces those service policy rules. In a typical implementation, for instance, each client device may subscribe to service of the access network and may have an associated service account or service profile defining a set of service policy rules, and the PDP may maintain or have access to each client device's set of service policy rules. When a client device registers with the access network, the PDP may then provide an indication of that client device's service policy rules to the PEP, so that the PEP can enforce the client device's service policy rules as the access network serves the client device.

Service policy rules for a given client device may define a quality of service to be provided to the client device, such as a data rate (e.g., guaranteed bit rate, maximum bit rate, or best effort service quality) and/or communication quality (e.g., voice and/or data encoding quality), as well as other restrictions (e.g., access control rules or content filtering rules) and/or allowances (e.g., entitlement to engage in certain services) regarding service level for the client device, in addition to policies regarding configuration of the access network when serving the client device. In practice, various client devices may have different service policy rules, possibly based on subscription level, device type, and/or other factors for instance.

OVERVIEW

Disclosed herein is a method and corresponding system to help facilitate the application of service policy rules for client devices while reducing the amount of signaling between network entities, such as PDPs and PEPs. The method is particularly useful in a scenario where a PDP provisions a PEP with a number of service policy rules for application by the PEP.

Typically, a PDP maintains a record of the service policy rules for the client device, as a service profile record for instance. A service profile record may indicate the various service policy rules and applicable triggers and parameters of each rule, such as indications of when the rules should apply and what the rules involve. For example, the service profile may specify various communication services or applications that the client device is entitled to use, such as whether the client device is entitled to engage in PSTN voice call communication and/or Internet data communication. As another example, the service profile may list various access control rules for the client device, such as particular network addresses that the client device is not entitled to contact. And as another example, the service profile may specify particular time of day restrictions on these or other rules.

A PEP may function to apply these rules. For instance, the PEP may apply a given rule by allowing the wireless network to serve the client device when such service accords with the given service policy rule. Alternatively, the PEP may apply a given rule by denying or preventing the wireless network from providing service to the client device when such service would violate or otherwise be inconsistent with the given service policy rule. To facilitate this, the PDP may provide the PEP with a copy of the client device's service profile or other indication of one or more service policy rules defined by the client device's profile. As the access network serves the client device, the PEP may then apply the client device's service policy rules. Alternatively, the PDP may provide real-time service directives to the PEP as the access network serves the client device. For instance, as the client device attempts to engage in particular communications, the PEP may signal to the PDP for guidance, the PDP may responsively consult the client device's service profile to decide which if any service policy rule applies, and the PDP may provide the PEP with a service directive to enforce the service policy rule.

In order to facilitate the above-described process while, at the same time, providing for efficient signaling between the PDP and the PEP, disclosed herein is a method operable to intelligently provision the PEP with just certain service policy rules. In accordance with one example embodiment of the method, before the PDP provisions the PEP with service policy rules for a given client device, the wireless network may evaluate the extent to which the service policy rules defined by the client device's service profile have been applied for the client device by the wireless network in the past. Based on this evaluating, the network may identify a subset of service policy rules that have been applied to greater than a threshold extent by the network for the given client device. And in response to this identifying, the network may cause the PDP to provision the PEP, with the subset of service policy rules, rather than provision the PEP with every possible service policy rule. As a result, the PDP and PEP may refrain from engaging in excess signaling (which may result from the PDP providing the PEP with the full set of possible service policy rules), and the wireless network, in turn, may enjoy reduced congestion.

These as well as other aspects, advantages, and alternatives will become apparent to those of ordinary skill in the art by reading the following detailed description, with reference where appropriate to the accompanying drawings. Further, it should be understood that the description provided by this document, including this overview section, is provided merely by way of example and without limitation.

DETAILED DESCRIPTION

Referring to the drawings, as noted above, FIG. 1 is a simplified block diagram of an example network arrangement in which the present method can be implemented. As shown, the arrangement includes an access network 12 that functions to provide client devices with connectivity to one or more transport networks. In particular, the access network 12 is shown providing a representative client device 14 (sometimes referred to herein as a user equipment device (UE)) with connectivity to a representative transport network 16. To facilitate providing this connectivity, the access network may include one or more components that communicate with the client device 14 and with the transport network 16 and that bridge those communications together to allow the client device to engage in communications with entities on the transport network.

Figure 1:
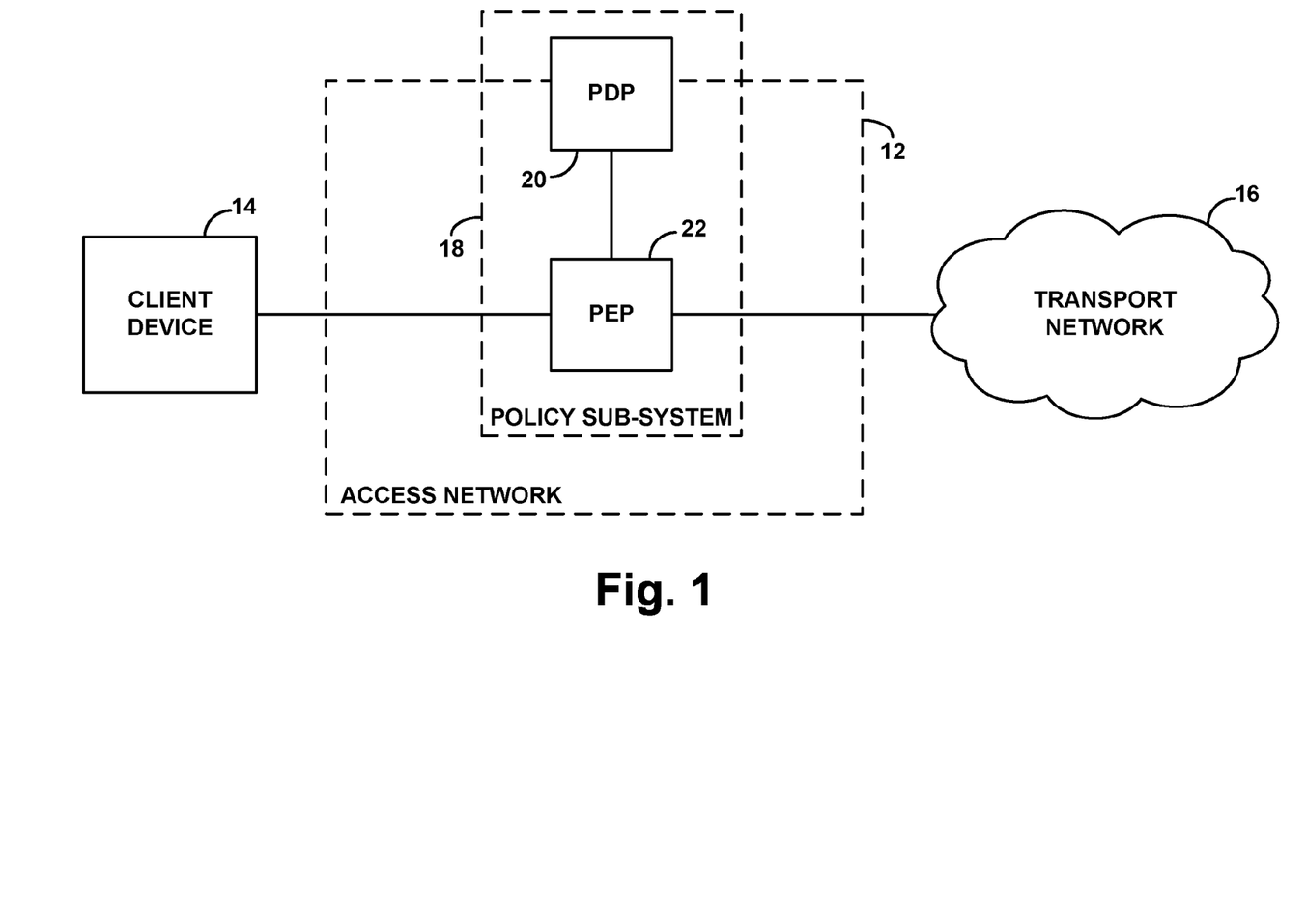
FIG. 1 is a simplified block diagram of an example network arrangement in which the present method can be implemented.

Access network 12 may be structured to provide various types of connectivity, such as landline, wireless, circuit-switched, and/or packet-switched, for various type of communications, such as voice and/or data for instance, and client device 14 and transport network 16 may be similarly configured. For instance, access network 12 may be a landline telephone network that provides circuit-switched connectivity for PSTN communications, in which case client device 14 may be a traditional landline telephone that engages in landline communication with the access network, and transport network 16 may be the PSTN. Alternatively, access network may be a radio access network that provides connectivity with the PSTN and/or the Internet, in which case client device 14 may be a user equipment device that engages in wireless communication with the access network, and transport network 16 may be the PSTN or the Internet.

As a specific example, access network 12 may be cellular wireless network that includes one or more wireless base stations arranged to serve client devices in accordance with an air interface protocol such as Orthogonal Frequency Division Multiple Access (OFDMA (e.g., Long Term Evolution (LTE) or Wireless Interoperability for Microwave Access (WiMAX)), Code Division Multiple Access (CDMA), Global System for Mobile Communications (GSM), WIFI, or the like, and a switch or gateway that connects with a transport network such as the PSTN or the Internet. Representative client device 14 may then be a user equipment device such as a cell phone, wirelessly-equipped computer, embedded wireless module, or the like, configured to be served wirelessly by such a base station and to engage in voice and/or data communication via the base station and the switch or gateway with entities on the PSTN or Internet. Other examples are possible as well.

In line with the discussion above, access network 12 may be arranged to serve client device 14 with telecommunication service (e.g., connectivity to communicate on transport network 16) in accordance with a particular set of service policy rules. As noted above, these service policy rules may define a quality of service to be provided to the client device, as well as other restrictions, allowances, and rules regarding configuration and operation of the access network when serving the client device. In practice, these service policy rules may be specific to the client device, pursuant to a service level agreement for instance, or may be generally applicable to various client devices served by the access network.

To facilitate this, access network 12 may be programmed with, have access to, or otherwise maintain a record of the service policy rules for client device 14 and may apply those service policy rules as the access network serves the client device. In particular, the access network may "apply" the service policy rules by being configured to enforce the service policy rules. For instance, if one of the service policy rules is to limit the client device's data rate to a particular level, the access network may apply that service policy rule by putting that data rate cap in place for the client device, so that if and when communication from the client device would exceed the cap, the access network may limit the rate to the cap. Likewise, if one of the service policy rules is to block communication by the client device to a particular network address, the access network may apply that service policy rule by putting that access control rule in place for the client device, so that if and when the client device attempts to communicate to that address, the access network may block the communication.

As shown in FIG. 1, the access network may include a policy-subsystem 18 that is arranged to maintain and apply the service policy rules for the client device. In particular, as shown, policy-subsystem 18 may include a policy decision point (PDP) 20 and a policy enforcement point (PEP) 22.

The PDP 20 may generally maintain a record of the service policy rules for the client device, as a service profile record for instance, which may indicate the various service policy rules and applicable triggers and parameters of each rule, such as indications of when the rules should apply and what the rules involve. For example, the service profile may specify various communication services or applications that the client device is entitled to use, such as whether the client device is entitled to engage in PSTN voice call communication and/or Internet data communication. As another example, the service profile may list various access control rules for the client device, such as particular network addresses that the client device is not entitled to contact. And as another example, the service profile may specify particular time of day restrictions on these or other rules.

The PEP 22 may then function to apply these rules as the access network serves the client device. For instance, when the access network begins serving the client device (such as when the client device first attaches to or registers with the access network and/or enters into an active or connected mode of communication with the access network), the PDP 20 may provide the PEP 22 with a copy of the client device's service profile or other indication of one or more service policy rules defined by the client device's profile. As the access network then serves the client device, the PEP 22 may then apply the client device's service policy rules. Alternatively, the PDP 20 may function to provide real-time service directives to the PEP 22 as the access network serves the client device. For instance, as the client device attempts to engage in particular communications, the PEP may signal to the PDP for guidance, the PDP may responsively consult the client device's service profile to decide which if any service policy rule applies, and the PDP may provide the PEP with a service directive to enforce the service policy rule.

In practice, the PEP may be a function of an access network component such as a switch or gateway that sits within the communication path between the client device and the transport network, so that the PEP can apply the service policy rules with respect to communications passing between the client device and the transport network. Alternatively, the PEP may be a function of an access network controller such as a mobility management entity or third party call control server that in some other manner governs operation of the access network and impacts how communications pass between the client device and the transport network. The PDP may then be co-located with the PEP or may be a function of another network component such as a home location register (HLR), a service control point (SCP), a home subscriber server (HSS), an authentication, authorization, and accounting server (AAA server), a policy charging and rules function (PCRF), or the like.

As the access network serves the client device with telecommunication service, communications to and from the client device may thus be subject to the service policy rules maintained and applied by the access network. For instance, communications from the client device may be limited to or allowed to have certain data rates or other communication quality levels, and communications from the client device to particular communication addresses or being of particular types may be blocked or allowed (e.g., for parent control or other purposes). To the extent the client device is user operated, the user of the client device may thus come to expect that the client device's communications will be subject to those service policy rules.

As indicated above, depending on the number of UEs being served by the wireless network and the number of service policy rules defined by each UE's profile, the real-time service directives provided by the PDP to the PEP may be a burden on the network, particularly if the number of UEs being served by the network is large. As also noted above, the present method helps to alleviate network congestion that may result from excessive signaling between the PDP and the PEP.

Figure 2:
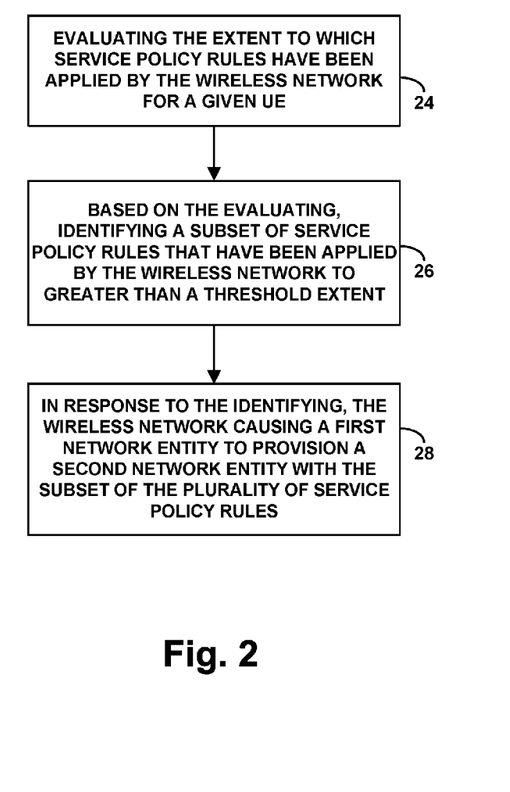
FIG. 2 is a flow chart depicting functions that can be carried out in accordance with the method.

FIG. 2 is a flow chart illustrating functions of the present method, which may be carried out by the PDP, or some other network entity. In accordance with the method, as shown at block 24, for a given UE registered for service in the wireless network or seeking to register for service in the wireless access network, the access network will evaluate the extent to which the service policy rules defined by the UE's service profile have been applied by the wireless network. At block 26, based on this evaluating, the access network identifies a subset of service policy rules that have been applied to greater than a threshold extent by the wireless network for the given UE. And at block 28, in response to the identifying, the wireless network causes a first network entity, such as a PDP, to provision a second network entity, such as a PEP, with the subset of service policy rules. In some embodiments of the method, the PDP provisioning the PEP with a subset of service policy rules means that the PDP provisions the PEP with just the subset of service policy rules and refrains from provisioning the PEP with service policy rules that are not identified in the subset of service policy rules. In this way, the wireless network may intelligently provision the PEP with a slimmed-down set of service policy rules that represent the rules most likely to be applied for a given UE. As a result, the PDP and PEP may refrain from engaging in excess signaling (which may otherwise result from the PDP providing the PEP with the full set of possible service policy rules), and the wireless network, in turn, may enjoy reduced congestion.

In this method, the act of evaluating the extent to which the service policy rules have been applied by the wireless network for a given UE may take various forms and may be performed by various components of the access network, such as by the PDP, PEP, MME, or some other network entity, for instance. To facilitate this act, the PDP (or some other entity) may keep, in data storage or the like, a log that indicates the extent to which certain service policy rules have been historically applied for the given UE. In one embodiment of the method, the act involves the wireless network evaluating the frequency with which each individual rule out of all service policy rules defined by the given UE's service profile has been applied for the given UE in a period of time. For instance, the wireless network may refer to the log and evaluate how often each service policy rule has been applied over a period of time (e.g., over the past month). Additionally or alternatively, in embodiments in which the PDP provides the PEP with service directives to enforce certain service policy rules, this act may involve referring to the log (or some other mechanism) and evaluating how often the PDP provides the PEP with service directives for each individual service policy rule.

As an example, the PDP may conduct this evaluation and determine that a first rule has been applied three times in the past month, a second rule has been applied ten times in the past month, and a third rule has not been applied in the past month. The wireless network may then identify a subset of the plurality of service policy rules that have been applied for the given UE with greater than a threshold frequency. Consistent with the above example, the wireless network may identify the first rule and the second rule as being applied to greater than a threshold frequency (e.g., twice per month), and as a result may provision the PEP with the first and second rule, but not the third rule. Other example thresholds are possible as well.

In another embodiment of the method, the act of evaluating the extent to which the service policy rules have been applied by the wireless network for a given UE may involve the wireless network determining, for each given rule of the plurality of service policy rules, whether the given rule has been applied for the given UE within a threshold period of time. For instance, the wireless network may refer to the log and determine which rules were applied for the UE within a threshold period of time (e.g., within the past week). Additionally or alternatively, in embodiments in which the PDP provides the PEP with service directives to enforce certain service policy rules, this act may involve referring to the log (or some other mechanism) and determining for which rules the PDP provided the PEP with service directives within the threshold period of time (e.g., within the past week).

As an example, the PDP may conduct this evaluation and determine that a first rule has been applied at least once in the past week, a second rule has not been applied in the past week, and the third rule has been applied at least once in the past week. The wireless network may then identify a subset of the plurality of service policy rules that have been applied for the given UE at least once within the threshold period of time (e.g., within the past week). Consistent with the above example, the wireless network may identify the first rule and the third rule as being applied at least once within the threshold period of time, and as a result may provision the PEP with the first and third rule, but not the second rule. Other example thresholds are possible as well.

To provision the PEP with a subset of service policy rules in accordance with the method, PDP may transmit to the PEP one or more provisioning messages that provide the PEP with specifications of the subset of the service policy rules. For example, the PDP entity may programmatically package the one or more service policy rules and send the package to the PEP. In practice, the act of transmitting one or more service policy rules to the PEP may involve storing the one or more service policy rules at a network address and transmitting to the PEP a trigger message that causes the PEP to request and retrieve the one or more service policy rules from that network address.

In particular, the service policy rules that the access network maintains and applies for the client device may include: rules specifying limits on how many internal connections (e.g., bearer links) within the access network can be reserved at any time for the client device, what components of the access network can be used to serve the client device, other parameters related to configuration and operation of the access network itself, rules related to allowed bit rates or coding levels for communications, restrictions on communication addresses that the client device is allowed to contact, and other such parameters that could be applied in other network contexts as well.

Advantageously through this process, the PDP may intelligently and selectively provision the PEP with just a select few service policy rules for a particular UE rather than provisioning the PEP with every possible service policy rule. In doing so, the PDP and the PEP may exchange fewer messages, which reduces signaling congestion in the network.

Figure 3:
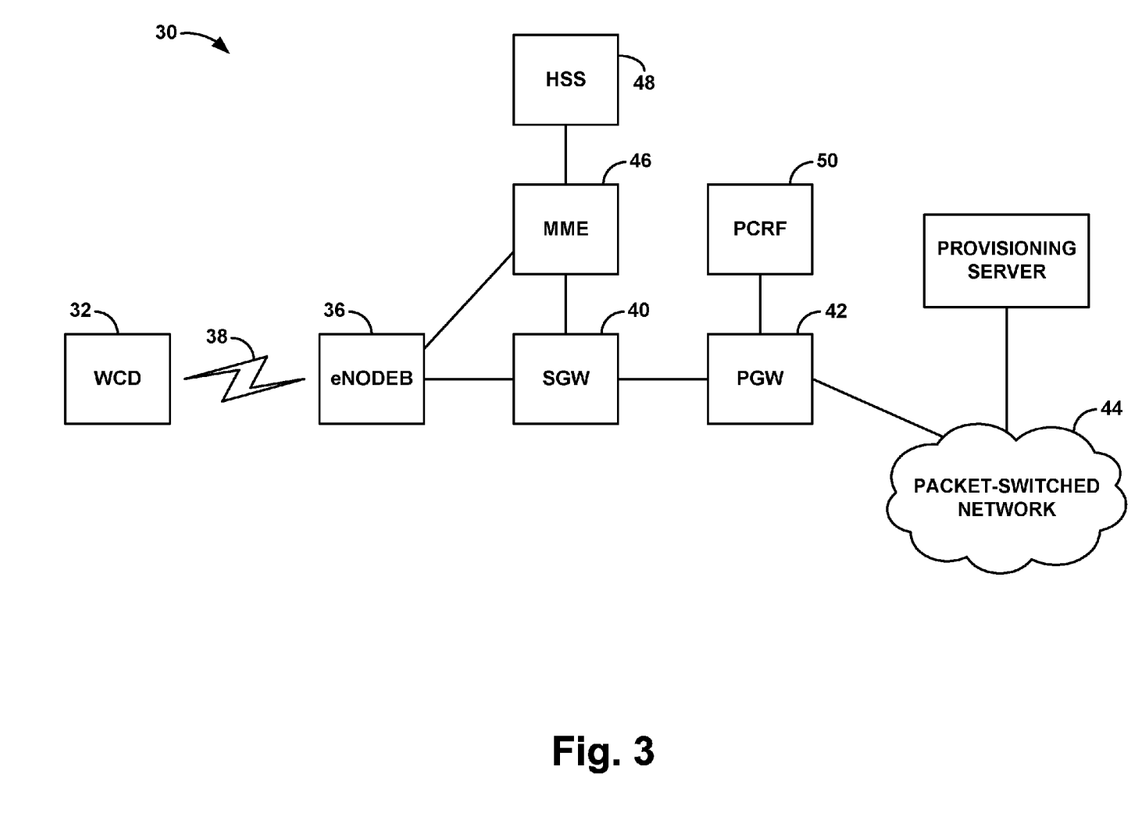
FIG. 3 is a simplified block diagram of another example network arrangement in which the method can be implemented.

FIG. 3 is next a more specific but still simplified depiction of a network arrangement in which the present method can be implemented. In particular, the figure depicts the access network as an LTE access network 30 and the client device as a user equipment device (UE) 32 served by the LTE network. Further, the figure depicts an example other network as a WiFi-based network 34 to which the user equipment device could transition to be served. It should be understood that these two types of access networks are just examples, and that the principles described can extend to apply with respect to any other types of access networks, such as wireless access networks operating in accordance with other air interface protocols for instance.

As shown in FIG. 3, the example LTE access network 30 includes components traditionally found in an LTE network. For instance, the LTE network includes an eNodeB 36 that serves the UE over an LTE air interface 38. The eNodeB then has an interface with a Serving Gateway (SGW) 40, which has an interface in turn with a Packet Gateway (PGW) 42 that provides connectivity with a packet-switched network 44 such as the Internet. Further, each eNodeB has an interface with a Mobility Management Entity (MME) 46, which functions as a signaling controller and to manage set up of bearer tunnels for transmission of data between the eNodeB and the PGW, to carry data traffic between the UE and the packet-switched network.

In addition, the MME has an interface with an HSS 48, and the HSS may function as a PDP and the MME may function as a PEP. For instance, the HSS may maintain a service profile record defining one or more service policy rules for the UE and may provide the MME with that service profile data when the UE attaches to or is served by the LTE network. The MME may then store that service profile data in a context record for the UE and apply the service policy rules as the LTE network serves the UE.

Likewise, the PGW has an interface with a PCRF 50, and the PCRF may function as a PDP and the PGW may function as a PEP. For instance, the PCRF may maintain a service profile record defining one or more service policy rules for the UE and may, from time to time, evaluate the extent to which the one or more service policy rules have been applied by the wireless network for a given UE, identify a subset of the service policy rules that have been applied by the wireless network to greater than a threshold extent, and provision the second network entity with the subset of the plurality of service policy rules.

In practice with this arrangement, when the UE enters into coverage of the eNodeB, the UE may detect a sufficiently strong reference signal from that eNodeB and may transmit to the eNodeB an attach request, seeking to connect with the eNodeB. Upon receipt of the attach request, the eNodeB may then pass the request to the MME. In response, the MME may then engage in signaling with the HSS to authenticate and obtain service profile data for the UE, so that the MME can apply service policy rules for the UE. Further, the MME may signal with the SGW, which may in turn signal with the PGW to facilitate setup of one or more bearers defining virtual tunnels for carrying data traffic through the LTE network between the UE and the PGW. In this process, the PGW may then engage in signaling with the PCRF to obtain service profile data for the UE, so that the PGW may apply service policy rules for the UE. In addition, while the LTE network is serving the UE, the network may establish still additional bearers for the UE to the extent permitted by and in accordance with the UE's service profile. With one or more bearers set up for the UE, data communication may then flow between the UE and the PGW and thus between the UE and entities on the packet-switched network 44.

The present method can apply in the arrangement of FIG. 3 in various ways. By way of example, if and when a given UE sends an attach request message to the eNodeB to request establishment of a communication session with the LTE network, the LTE network may respond by provisioning the PGW with service policy rules applicable to the given UE so that the LTE network can provide telecommunication service to the given UE in accordance with the service policy rules. For instance, when the MME receives the UE's attach request, the MME may signal to the HSS and/or to the SGW, which may signal to the PGW, which may in turn signal to the PCRF. In response to learning that the UE desires to attach, the PCRF may conduct an evaluation as to the extent to which the service policy rules defined by the UE's service profile have been applied by the wireless network. Based on this evaluating, the PCRF may identify a subset of service policy rules that have been applied to greater than a threshold extent by the wireless network for the given UE. And in response to the identifying, the PCRF may provision the PGW with the subset of service policy rules in accordance with any of the above-described procedures.

Figure 4:
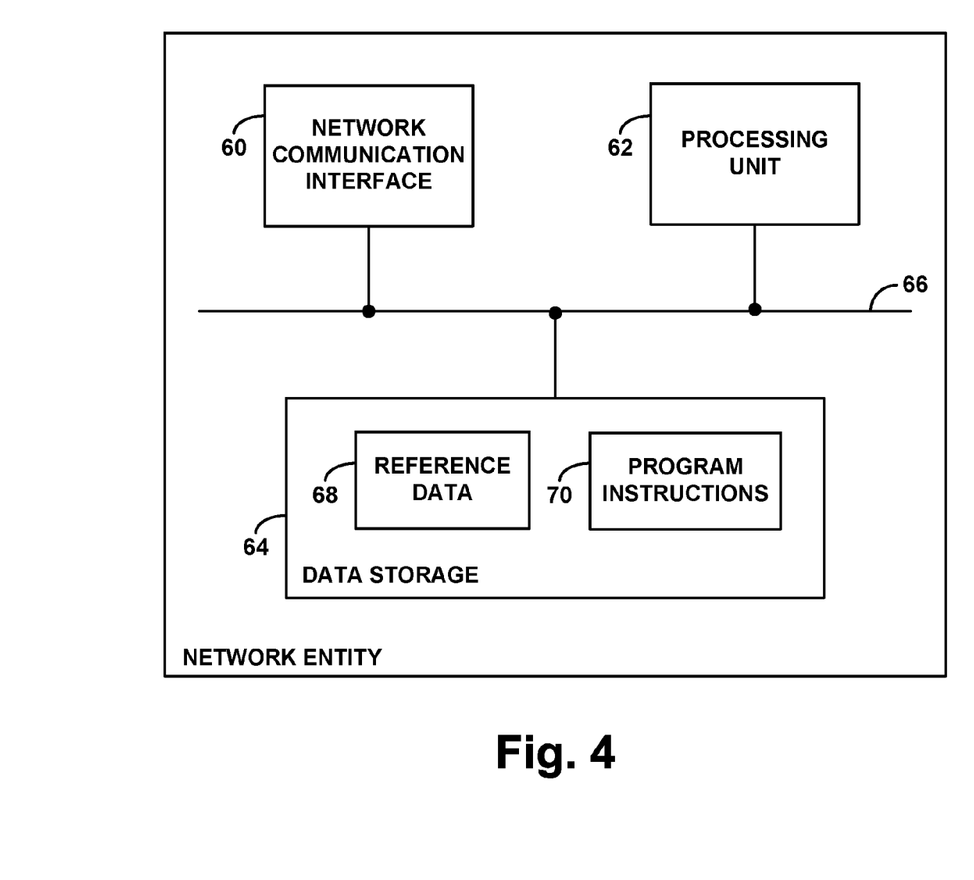
FIG. 4 is a simplified block diagram depicting components of one or more network entities that may carry out aspects of the method.

FIG. 4 is next a simplified block diagram depicting components of one or more example access network entities that may be arranged to carry out various aspects of the present method. As shown in FIG. 4, the components include a network communication interface 60, a processing unit 62, and data storage 64, all of which may be communicatively linked together by a system bus, network, or other connection mechanism 66.

In this example arrangement, network communication interface 60 functions to facilitate communication with various other entities of the system. As such, the interface may include a wired or wireless Ethernet module or other interface, depending on the manner in which communication will occur. Processing unit 62 may then comprise one or more general purpose processors (e.g., microprocessors) and/or one or more special purpose processors (e.g., application specific integrated circuits or digital signal processors). And data storage 64 may comprise one or more volatile and/or non-volatile storage components (non-transitory), such as magnetic, optical, flash, or organic storage components.

As shown, data storage 64 may contain reference data 68 and program instructions 70. Reference data 68 may comprise service profile data for each of various client devices and may thus define for each client device a set of service policy rules that the access network would apply when serving the client device with telecommunication service. Program instructions 70, in turn, may then comprise machine language instructions or the like that are executable by the processing unit 62 to carry out various functions described herein, such as evaluating the extent to which one or more service policy rules have been applied by the wireless network for a given UE, identifying a subset of the service policy rules that have been applied by the wireless network to greater than a threshold extent, and provisioning the second network entity with the subset of the plurality of service policy rules.

Figure 5:
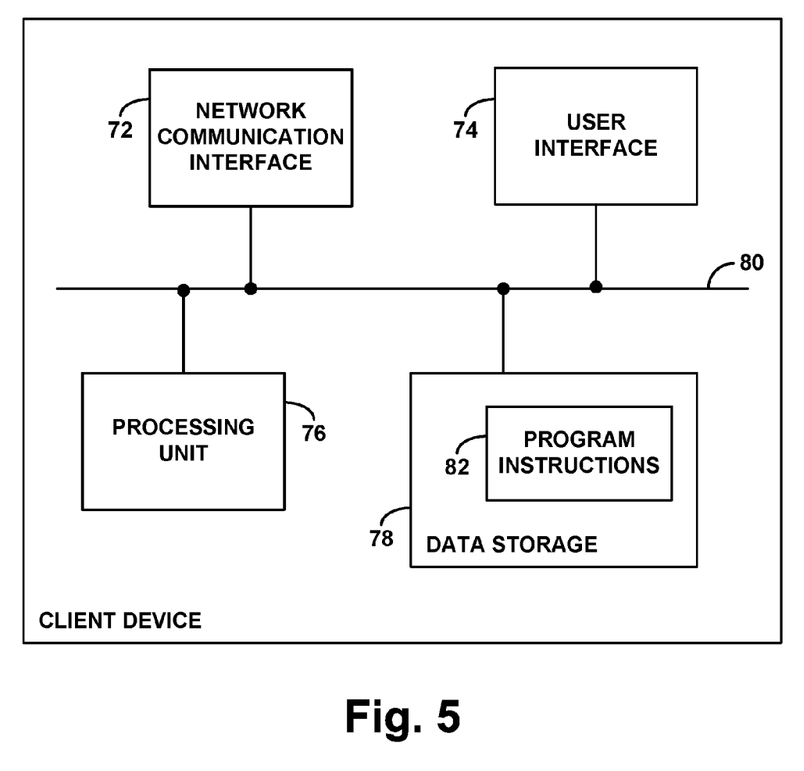
FIG. 5 is a simplified block diagram depicting components of a client device that may benefit from operation of the method.

FIG. 5 is then a simplified block diagram depicting components of an example client device that may be arranged to benefit from operation of the present method. As shown, the example client device includes a network communication interface 72, a user interface 74, a processing unit 76, and data storage 78, all of which may be communicatively linked together by a system bus, network, or other connection mechanism 80.

In this example arrangement, network communication interface 72 functions to facilitate communication with one or more access networks, such as those discussed above for instance, and may thus take various forms to facilitate various types of communication such as wireless, landline, circuit-switched, and/or packet-switched communication. For example, the network communication interface may comprise a wireless communication chipset and antenna structure configured to communicate with one or more radio access networks such as the LTE and WiFi networks shown in FIG. 3.

User interface 74 may then comprise one or more user interface components to facilitate interaction with a user of the client device if appropriate (if the client device is user-operated), including input components such a keypad, touch-sensitive surface, microphone, and camera, and output components such as a display screen and sound speaker. Further, processing unit 76 may comprise one or more general purpose processors (e.g., microprocessors) and/or one or more special purpose processors (e.g., application specific integrated circuits or digital signal processors). And data storage 78 may comprise one or more volatile and/or non-volatile storage components (non-transitory), such as magnetic, optical, flash, or organic storage components. As shown, data storage 78 may contain program instructions 82, which may comprise machine language instructions executable by processing unit 76 to carry out various client device functions.

Exemplary embodiments have been described above. Those skilled in the art will appreciate, however, that many variations from the embodiments are possible while remaining within the spirit and scope of the claims.

We claim:

1. In a wireless access network in which a first network entity maintains a plurality of service policy rules and is configured to provision a second network entity with the set of service policy rules, the second network entity being configured to apply one or more of the service policy rules for a user equipment device (UE) such that the wireless access network serves the UE with telecommunication service in a manner consistent with the applied one or more service policy rules, a method comprising:
    for a given UE, evaluating a frequency with which each given rule of the plurality of service policy rules has been applied for the given UE in a period of time;
    based on the evaluating, identifying a subset of the plurality of service policy rules that have been applied by the wireless network for the given UE with greater than a threshold frequency; and
    in response to the identifying, causing the first network entity to provision the second network entity with the subset of the plurality of service policy rules.

2. The method of claim 1,
    wherein evaluating a frequency with which each given rule of the plurality of service policy rules has been applied for the given UE in a period of time comprises: determining, for each given rule of the plurality of service policy rules, whether the given rule has been applied for the given UE within a threshold period of time, and
    wherein identifying a subset of the plurality of service policy rules that have been applied by the wireless network for the given UE with greater than a threshold frequency comprises: identifying a subset of the plurality of service policy rules that have been applied for the given UE at least once within the threshold period of time.

3. The method of claim 1,
    wherein evaluating a frequency with which each given rule of the plurality of service policy rules has been applied for the given UE in a period of time comprises: evaluating the frequency with which each given rule of the plurality of service policy rules has been applied for the given UE in a period of time, and determining, for each given rule of the plurality of service policy rules, whether the given rule has been applied for the given UE within a threshold period of time; and
    wherein identifying a subset of the plurality of service policy rules that have been applied by the wireless network for the given UE with greater than a threshold frequency comprises: identifying a subset of the plurality of service policy rules that have been applied for the given UE with greater than a threshold frequency and that have been applied for the given UE at least once within the threshold period of time.

4. The method of claim 1, wherein the first network entity carries out the evaluating.

5. The method of claim 1, further comprising:
    causing the first network entity to refrain from providing the second network entity with service policy rules that are not identified in the subset of the plurality of service policy rules.

6. The method of claim 1, wherein the wireless access network is a Long Term Evolution (LTE) access network, wherein the UE is an LTE-capable client device, wherein the second network entity comprises a packet gateway (PGW) that provides the UE with connectivity to a packet-switched network when the UE is served by at least one base station, wherein the first network entity comprises a policy charging and rules function (PCRF).

7. A wireless network comprising:
    a first network entity configured to maintain a plurality of service policy rules and provision a second network entity with the set of service policy rules;
    a second network entity configured to apply one or more of the service policy rules for a user equipment device (UE) such that the wireless access network serves the UE with telecommunication service in a manner consistent with the applied one or more service policy rules;
    a processing unit;
    data storage; and
    program instructions stored in the data storage and executable by the processing unit to carry out functions comprising:
        for a given UE, evaluating a frequency with which each given rule of the plurality of service policy rules has been applied for the given UE in a period of time;

based on the evaluating, identifying a subset of the plurality of service policy rules that have been applied by the wireless network for the given UE with greater than a threshold frequency; and in response to the identifying, causing the first network entity to provision the second network entity with the subset of the plurality of service policy rules.

8. The wireless network of claim 7,
wherein evaluating a frequency with which each given rule of the plurality of service policy rules has been applied for the given UE in a period of time comprises: determining, for each given rule of the plurality of service policy rules, whether the given rule has been applied for the given UE within a threshold period of time, and
wherein identifying a subset of the plurality of service policy rules that have been applied by the wireless network for the given UE with greater than a threshold frequency comprises: identifying a subset of the plurality of service policy rules that have been applied for the given UE at least once within the threshold period of time.

9. The wireless network of claim 7,
wherein evaluating a frequency with which each given rule of the plurality of service policy rules has been applied for the given UE in a period of time comprises: evaluating the frequency with which each given rule of the plurality of service policy rules has been applied for the given UE in a period of time, and determining, for each given rule of the plurality of service policy rules, whether the given rule has been applied for the given UE within a threshold period of time; and
wherein identifying a subset of the plurality of service policy rules that have been applied by the wireless network for the given UE with greater than a threshold frequency comprises: identifying a subset of the plurality of service policy rules that have been applied for the given UE with greater than a threshold frequency and that have been applied for the given UE at least once within the threshold period of time.

10. The wireless network of claim 7, wherein the program instructions are further executable by the processing unit to cause the first network entity to carry out the evaluating.

11. The wireless network of claim 7, wherein the program instructions are further executable by the processing unit to cause the first network entity to refrain from providing the second network entity with service policy rules that are not identified in the subset of the plurality of service policy rules.

12. The wireless network of claim 7, wherein the wireless access network is a Long Term Evolution (LTE) access network, wherein the UE is an LTE-capable client device, wherein the second network entity comprises a packet gateway (PGW) that provides the UE with connectivity to a packet-switched network when the UE is served by at least one base station, wherein the first network entity comprises a policy charging and rules function (PCRF).

13. A first network entity configured to: (i) operate within a wireless access network; (ii) maintain a plurality of service policy rules, which when applied by a second network entity for a user equipment device (UE), the wireless access network serves the UE with telecommunication service in a manner consistent with the applied one or more service policy rules; and (iii) provision a second network entity with the set of service policy rules, the first network entity comprising:

a processing unit;
data storage; and
program instructions stored in the data storage and executable by the processing unit to carry out functions comprising:
for a given UE, evaluating a frequency with which each given rule of the plurality of service policy rules has been applied for the given UE in a period of time;
based on the evaluating, identifying a subset of the plurality of service policy rules that have been applied by the wireless network for the given UE with greater than a threshold frequency; and
in response to the identifying, causing the first network entity to provision the second network entity with the subset of the plurality of service policy rules.

14. The first network entity of claim 13,
wherein evaluating a frequency with which each given rule of the plurality of service policy rules has been applied for the given UE in a period of time comprises: determining, for each given rule of the plurality of service policy rules, whether the given rule has been applied for the given UE within a threshold period of time, and
wherein identifying a subset of the plurality of service policy rules that have been applied by the wireless network for the given UE with greater than a threshold frequency comprises: identifying a subset of the plurality of service policy rules that have been applied for the given UE at least once within the threshold period of time.

15. The first network entity of claim 13,
wherein evaluating a frequency with which each given rule of the plurality of service policy rules has been applied for the given UE in a period of time comprises: evaluating the frequency with which each given rule of the plurality of service policy rules has been applied for the given UE in a period of time, and determining, for each given rule of the plurality of service policy rules, whether the given rule has been applied for the given UE within a threshold period of time; and
wherein identifying a subset of the plurality of service policy rules that have been applied by the wireless network for the given UE with greater than a threshold frequency comprises: identifying a subset of the plurality of service policy rules that have been applied for the given UE with greater than a threshold frequency and that have been applied for the given UE at least once within the threshold period of time.

16. The first network entity of claim 13, wherein the program instructions are further executable by the processing unit to cause the first network entity to refrain from providing the second network entity with service policy rules that are not identified in the subset of the plurality of service policy rules.

17. The first network entity of claim 13, wherein the wireless access network is a Long Term Evolution (LTE) access network, wherein the UE is an LTE-capable client device, wherein the second network entity comprises a packet gateway (PGW) that provides the UE with connectivity to a packet-switched network when the UE is served by at least one base station, wherein the first network entity comprises a policy charging and rules function (PCRF).

* * * * *